United States Patent [19]

Belmuth

[11] 4,302,747
[45] Nov. 24, 1981

[54] ANTI-THEFT DEVICE FOR ENGINE PROPELLED VEHICLES

[75] Inventor: Neal W. Belmuth, Great Neck, N.Y.

[73] Assignee: Nationwide Ultraseal Inc., Westbury, N.Y.

[21] Appl. No.: 61,395

[22] Filed: Jul. 27, 1979

[51] Int. Cl.³ ..................... B60R 25/04; B60R 25/10
[52] U.S. Cl. .................................. 340/64; 180/287; 307/10 AT; 340/63
[58] Field of Search .......................... 340/64, 63, 53; 307/10 AT; 180/287

[56] References Cited

U.S. PATENT DOCUMENTS

| | | | |
|---|---|---|---|
| 3,614,458 | 10/1971 | Stein | 340/64 X |
| 3,879,705 | 4/1975 | Binder et al. | 340/53 |
| 3,885,164 | 5/1975 | Vest | 340/64 X |
| 3,986,166 | 10/1976 | Kohn | 307/10 AT X |
| 4,074,672 | 2/1978 | LaDue et al. | 340/64 X |
| 4,107,962 | 8/1978 | MacKinnon | 307/10 AT X |
| 4,151,509 | 4/1979 | Winiczei | 307/10 AT X |

Primary Examiner—John W. Caldwell, Sr.
Assistant Examiner—Joseph E. Nowicki
Attorney, Agent, or Firm—Matthew M. Russo; Ernest F. Weinberger

[57] ABSTRACT

A circuit for inhibiting the operation of an engine after the engine has functioned for a specific period of time. The circuit basically includes a timing network, a concealed switch, a timing disable network, an audible alarm, and relay. When the engine is started by an unauthorized operator, who is unaware of the concealed switch, the engine will operate in the normal manner upon closure of the ignition switch. Closure of the ignition switch applies battery power to the timing circuit which starts to "time out". Subsequently, when the timing circuit "times out", battery current flows through the relay coil, its contacts close to thereby connect a capacitor across the ignition points of the engine. The engine is thereby disabled after the vehicle has travelled a relatively short distance. An authorized user of the vehicle, knowing the existence and location of the concealed switch momentarily closes the switch after the engine has been started but prior to completion of the time out cycle and thereby disables the timing network. This permits unrestricted operation of the vehicle. Since the concealed switch was only activated momentarily through a silicon controlled rectifier, the timing network will be automatically reset upon opening of the ignition switch.

10 Claims, 2 Drawing Figures

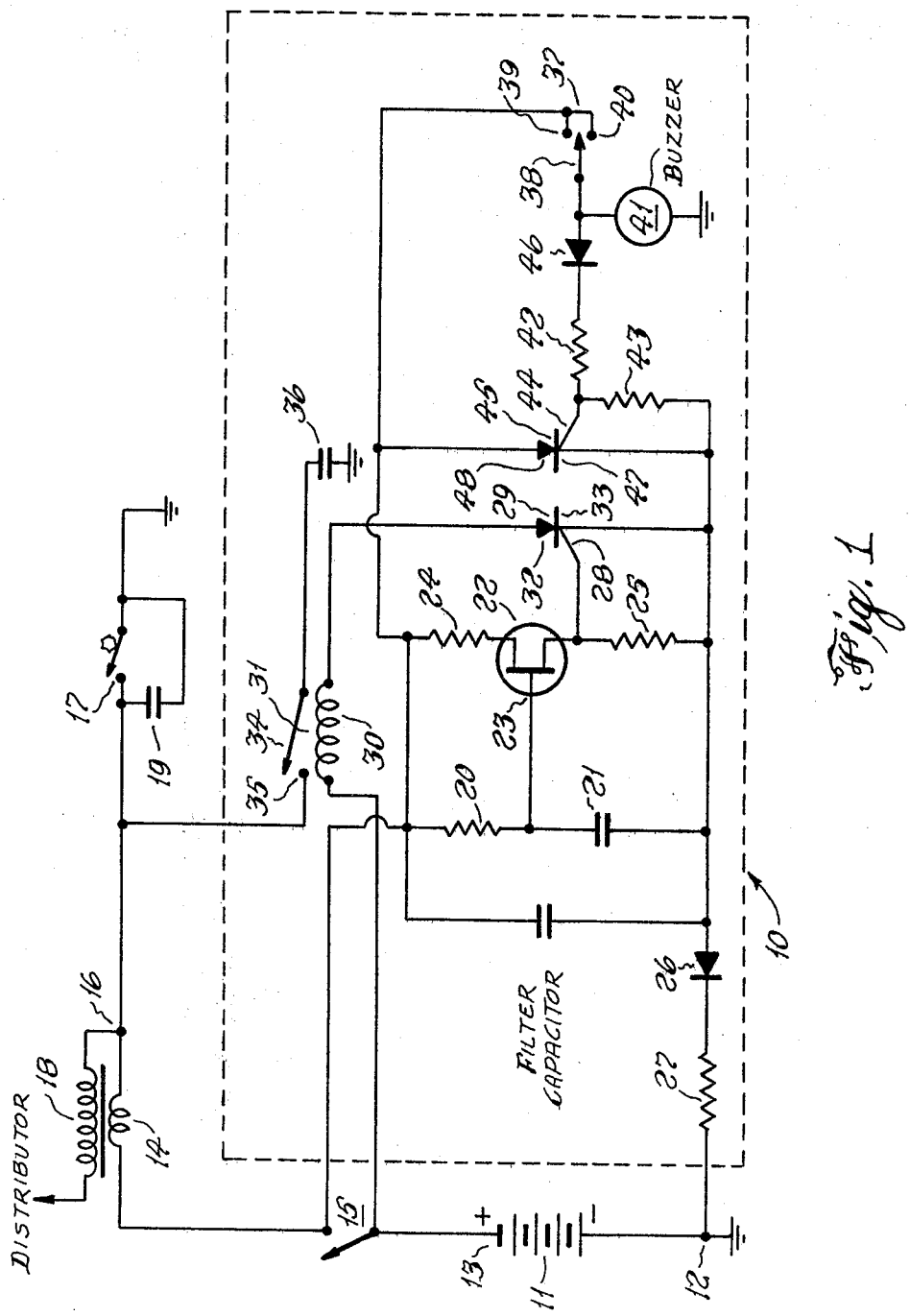

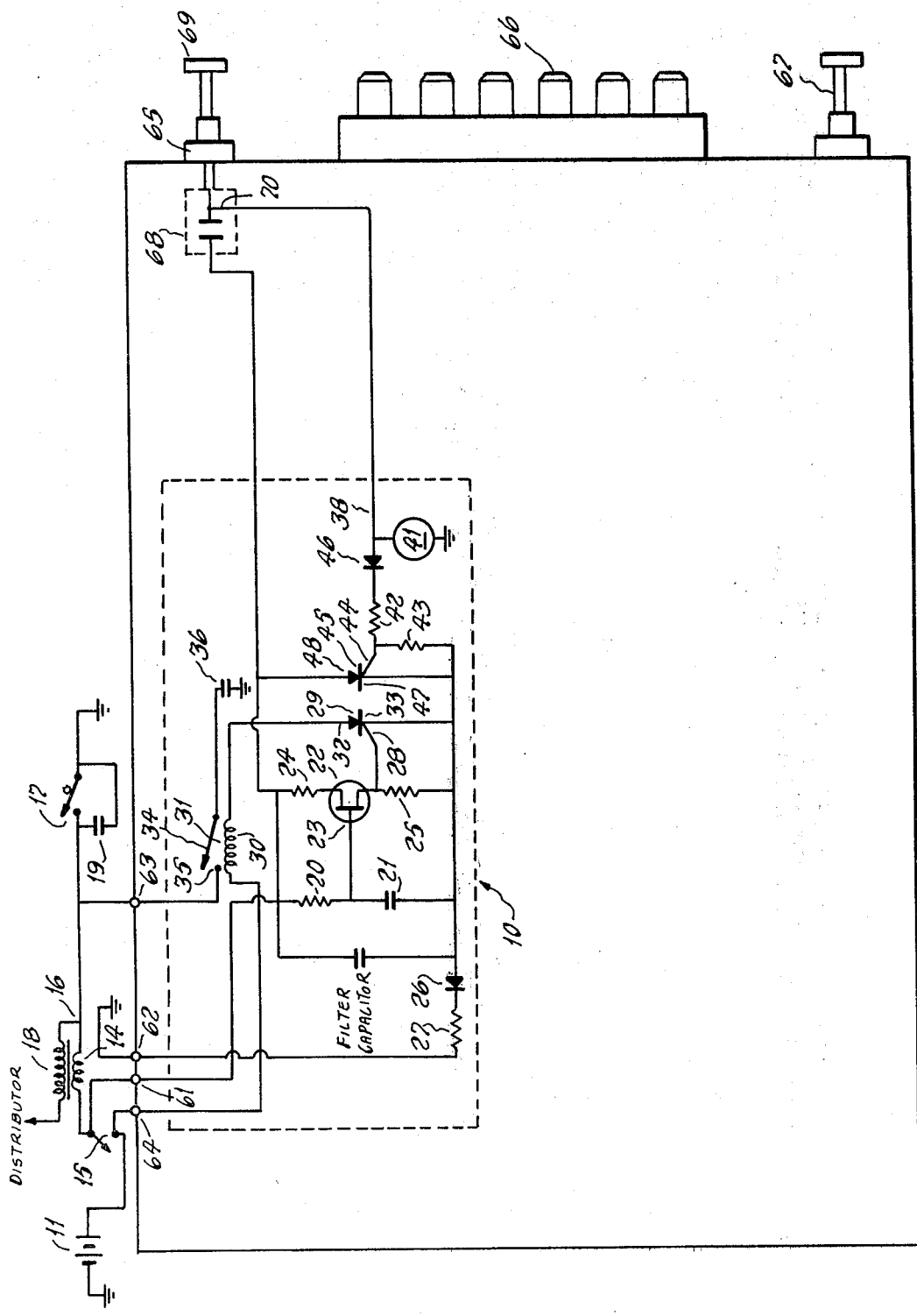

ANTI-THEFT DEVICE FOR ENGINE PROPELLED VEHICLES

BACKGROUND OF THE INVENTION

1. Field of the Invention

The present invention relates in general to anti-theft devices and more particularly pertains to anti-theft circuits for application to engine propelled vehicles having electrical ignition systems.

2. Description of the Prior Art

In the field of vehicle anti-theft devices it has been the general practice to employ apparatus of an electromechanical nature to disable the engine or to produce an audible alarm or a combination thereof. Inherent difficulties are present in the majority of these devices. For example, they are complex, large structures, difficult to install and repair, require maintenance and are so arranged that should they malfunction, the vehicle becomes disabled.

The present theory in designing anti-theft devices is to permit unauthorized use of the vehicle for a limited time. Such limited use by a thief will allow him to drive the vehicle for a short distance, which vehicle, then becomes disabled. The thief is now in unfamiliar or hostile surroundings and rather than expose himself to scrutiny while attempting to disarm the device, he will abandon his efforts and look elsewhere.

Timing networks such as those shown in U.S. Pat. Nos. 4,107,962, 4,004,273 or thermal time delay units as in U.S. Pat. Nos. 2,205,104 and 3,614,458 are used to initiate the disablement of an engine or vehicle at some predetermined time after it has been started. The precise disable function may be through a fuel pump, the ignition, battery or any other part vital to the engine's operation.

The majority of anti-theft devices presently on the market are large, complex and when in use dissipate considerable energy in the form of heat. Such structural characteristics do not permit the necessary freedom of location within the vehicle whereby they can be readily hidden from view, much less undetectable to an experienced thief. In addition, should the thief be aware of the existence of an anti-theft device, he may readily defeat the device or in attempting to do so, damage the device or the vehicle.

Another inherent disadvantage to present devices is the fact that the device must be armed or activated by the operator upon leaving the vehicle. Unless the operator is alerted or in some way reminded, he will on numerous occasions fail to arm the device, especially in view of the fact that the device is in a hidden location.

Accordingly, it is an object of this invention to provide a relatively simple, compact, inexpensive and reliable vehicle anti-theft device which is easily installed, readily hidden from view and requires minimum maintenance.

Another object is to provide an anti-theft device which after a predetermined time subsequent to starting the vehicle engine, will disable the ignition circuit and thereby prevent engine function.

A further object of this invention is the provision of an anti-theft device which is automatic in operation and which does not require arming by the operator but which device may be by-passed by the legitimate operator to permit use of the vehicle by others. Under the latter condition, the device will provide a signal to alert the operator that the device is in the disabled state when he again assumes control of the vehicle.

A still further object of this invention is to provide an anti-theft device which, while functioning, will not deplete the vehicle's electrical energy nor dissipate considerable amounts of heat when the ignition circuit is disabled.

Other objects and many of the attendant advantages of this invention will be readily appreciated as the same becomes better understood by reference to the following detailed description when considered in connection with the accompanying drawing.

SUMMARY OF THE INVENTION

The general purpose of this invention is to provide a vehicle anti-theft device that has all the advantages of similarly employed prior art devices and has none of the aforementioned disadvantages. To attain this, the present invention provides a unique, compact circuit which includes a relay whose contacts are normally open. The relay contacts are arranged in circuit so as to connect a relatively large capacitor across the engine ignition points when closed. Upon closure of the ignition switch, an R-C timing network commences to charge. The R-C voltage is applied to the control element of a unijunction transistor and, when this voltage, after a preselected time period, becomes sufficiently high, the unijunction will "turn on". The current flowing through the unijunction provides a sufficient voltage across a resistor to trigger an SCR. This SCR is connected in series with the coil of the relay and upon the SCR being "triggered on", the battery current flowing through the coil causes its contacts to close, thereby connecting the large capacitor across the ignition points to disable the vehicle engine. The foregoing constitutes the sequence of events when unauthorized use of the vehicle is attempted.

The device further includes a concealed switch, a buzzer and a second SCR. The switch either in its momentary or continuous position simultaneously applies battery voltage (ignition switch on) to the buzzer and via a resistor to the gate of the second SCR to turn it "on". This second SCR is in shunt across the relay coil so that the SCR presents an extremely low impedance across the coil. When SCR conducts, insufficient current flows through the relay coil, the relay contacts open and remain in this condition irrespective of the state of the unijunction transistor. Thus, the function of the timing network has been disabled and the vehicle engine will operate normally. Operation of the buzzer indicates to the authorized user that the anti-theft device is inoperative.

BRIEF DESCRIPTION OF THE DRAWING

FIG. 1 is a schematic drawing illustrating an embodiment made in accordance with the principle of this invention.

FIG. 2 is a drawing illustrating an embodiment of the invention incorporated with an automobile accessory such as a radio.

DESCRIPTION OF THE PREFERRED EMBODIMENT

The illustrated embodiment of this invention is shown within the block 10 while the components without the block represent standard electrical parts associated with an internal combustion engine. Typically, the anti-theft device may be applied to a vehicle engine which includes a battery 11 having one terminal 12 grounded and the other terminal 13 connected to the ignition coil 14 through ignition switch 15. The opposite end 16 of the ignition primary coil connects to ignition points 17 while the secondary coil 18 delivers a high voltage to the distributor. The small valued capacitor 19 across the points serves to protect them when they periodically open.

The anti-theft device includes an R-C timing network consisting of series connected resistor 20 and capacitor 21. Consider first the situation where an unauthorized person attempts to use the vehicle. He first turns the ignition "on" or jumps the ignition switch 15. This immediately applies battery voltage to the timing network and, dependent on the respective values of resistor 20 and capacitor 21, the voltage across the capacitor 21 will rise within a preselected time period to a value sufficient to trigger unijunction transistor 22 to a conducting state. The voltage across capacitor 21 is applied to the gate or control element 23 of unijunction transistor 22 and when the transistor "turns on", battery current flows through bias resistor 24, the unijunction 22, bias resistor 25, diode 26 and limiting resistor 27. The voltage developed across bias resistor 25 is applied to the gate 28 of silicon controlled rectifier (SCR) 29 and triggers the SCR into its conduction state. With the SCR 29 conducting, battery current flows through the coil 30 of relay 31, through the anode 32, cathode 33 of the SCR, diode 26 and limiting resistor 27. The value of resistor 27 is selected such that the current flowing is just sufficient to activate the contact arm 34 of relay 31 and move it from its normally open position (as illustrated) to close and make contact with terminal contact 35. Closure of the relay contacts connects capacitor 36 across the ignition points 17 and capacitor 19.

Under normal conditions when the ignition points are closed, a magnetic field developes across the primary coil 14. The sudden opening of the points causes an extremely rapid collapse of this field and thereby induces a high voltage in the secondary 18. This high secondary voltage, in the neighborhood of 20,000 volts, provides the arc across the engine's spark plugs. Although capacitor 19 is across the ignition points 17, its capacitance is so low that it has negligible effect on the operation. However, when a large capacitor, such as capacitor 36 (20 microfarads) is connected across the points, it prevents the magnetic field from collapsing rapidly. Effectively this capacitor serves as an energy reservoir and absorbs the energy in the field, thus allowing the field to collapse slowly. With a large capacitor, the magnetic field collapses at such a slow rate that the voltage developed across the secondary is insufficient to generate a spark to maintain engine operation.

Consider now the operation of the vehicle by the legitimate owner or an authorized operator who is aware of the existence and the location of the concealed switch 37. This concealed switch is preferable of the type that includes a "momentary" contact position, a "continuous" contact position and an intermediate "off" position. The illustrated schematic switch has a movable pole contact 38 (shown in the off position) and a pair of fixed contacts 39 for momentary operation, and 40 for continuous "on". Both fixed contacts are connected to the battery+terminal through the ignition switch. The authorized operator first turns the ignition switch "on" and starts the engine. He then (prior to time out of the device —40 seconds) operates switch 37. When the switch pole 38 is moved to the momentary contact 39, battery voltage is applied to the buzzer 41 which immediately produces an audible signal, alerting the operator that the anti-theft device is functioning and that the device has been disabled. Resistors 42 and 43 constitute a voltage divider in order to provide the proper voltage for the gate 44 of SCR 45. In addition, resistor 42 limits the current flow through gate 44 since the gate 44 circuit, upon triggering, has a low impedance. Resistor 43 substantially lowers the sensitivity of gate 44, thereby preventing spurious triggering. Diode 46 prevents reverse current from flowing through the gate to buzzer 41. Such reverse current would activate the buzzer on a continuous basis even though only a momentary switch contact was made.

With a portion of the battery potential appearing across gate 44 and cathode 47, SCR 45 is triggered "on" to its conducting state. In this state the SCR presents an extreme low impedance (almost a short circuit) between anode 48 and cathode 47. Circuitwise this SCR 45 is connected in parallel or across relay coil 30 and therefore when it is conducting, it effectively shorts out the relay coil so that the coil cannot receive sufficient current to maintain its contacts in their closed position. If the relay contacts are initially closed when SCR 45 "fires" then the contacts open. If the relay contacts are initially open they will remain open irrespective of the operation of the timing circuit since SCR 45 will stay in its conducting state until the ignition switch is turned off.

Switch 37 is provided with the above described positions (single pole, double throw) in order to permit an authorized operator to disable the anti-theft device after starting the engine by using the momentary position. However, when the vehicle is to be temporarily turned over to an authorized person, such as a parking valet or service station attendant, the continuous switch position is employed. As in the case of momentary operation, the anti-theft device is disabled or defeated but now the buzzer continuously emits an audible signal. In addition, the ignition may be turned off and thereafter the engine restarted without reactivating the anti-theft device since SCR 45 fires when the ignition is turned on. When the vehicle is returned to the legitimate owner by an authorized operator, the buzzer continues to sound. The owner is alerted to the fact that the anti-theft device is disabled and he then reactivates the device. Generally, since all vehicles normally contain various buzzers (ie, seat belts) an authorized operator, such as an attendant will not necessarily be aware that the vehicle is provided with an anti-theft apparatus.

In the illustrated embodiment of FIG. 2 the basic anti-theft device 10 of FIG. 1 has been incorporated into the circuitry of an automotive accessory, in this case a radio. Likewise, the anti-theft device may be readily incorporated into other accessories, such as cassette and eight track tape players, CB radios or any electrical accessory which receives its electrical input from the vehicle battery.

Automotive electrical accessories, such as radio 60 include as part of their normal circuitry an electrical power input 61 from the ignition switch 15 or from an accessory switch (not shown) to supply power for the radio and a ground connection 62. In addition to the foregoing, in most cases, it is only necessary to provide an external connection 63 to the output side 16 of the ignition coil 18 and an external connection 64 to the battery 11.

Internally, the hidden or concealed switch 37 of FIG. 1 may be incorporated into one of the accessories (radio) existing control elements. As for example, the volume control 65, one of the timing pushbuttons 66 or the on-off switch 67 of radio 60. A rather simple expedient that has been found suitable is to provide the volume control with a "push-pull" switch element. Such volume control elements are presently available and in wide use. The "push-pull" switch 68 coupled to the knob 69 provides the same function as switch 37 (FIG. 1) and may include a "momentary" switch position. By internally connecting switch 68 in substitution for switch 37 (FIG. 1) the overall circuitry is identical to that shown in FIG. 1 and the anti-theft device operates as previously described.

In the same manner, it is clear that the entire anti-theft device of FIG. 1 can be incorporated into the accessory circuit board during manufacture and thereby provide a dual function unitary structure whose outward appearance would not reveal its multiple function.

From the foregoing description, it is evident that there is provided an automatically resetting vehicle anti-theft device which includes a minimum of circuit components. Additionally, the device provides an audible signal when deactivated, operates with a minimum drain on the vehicle's battery and generates minimal heat while being compact and highly reliable.

It should be understood, of course, that the foregoing disclosure relates to only a preferred embodiment of the invention and that numerous modifications or alterations may be made therein without departing from the spirit and the scope of the invention as set forth in the appended claims.

I claim:

1. An anti-theft device for an engine propelled vehicle wherein said vehicle includes an ignition switch connecting a source of electrical energy to an ignition coil and ignition points for delivering high voltage electrical energy from said ignition coil to a distributor, said device comprising:
    a first bistable means having an engine operating position and an engine disabling position, said first bistable means normally assuming said operating position;
    a second bistable means capable of assuming a conducting state and a non-conducting state and connected to function said first bistable means to its disabling position when said second means assumes its conducting state;
    a timing network in circuit with said ignition switch to commence timing upon the closure of said ignition switch and having its output coupled to said second bistable means for causing said second bistable means to assume its conducting state at the termination of the timing period;
    a concealed switch means coupled to activate,
    an inhibit means, said inhibit means being connected to said first bistable means to prevent said first bistable means from assuming the disabling position upon operation of said concealed switch means.

2. The anti-theft device, according to claim 1, wherein said first bistable means includes a relay having a coil and response contacts connected to couple a capacitor across said ignition points to thereby disable the vehicle engine.

3. The anti-theft device, according to claim 2, wherein said second bistable means includes:
    a unijunction transistor having its control element connected to receive the output from said timing network; and
    a silicon controlled rectifier having its gate connected to receive the output of said unijunction transistor.

4. The anti-theft device, according to claim 3, further including a series electrical path which includes:
    said source of electrical energy, and
    said relay coil;
    whereby when said silicon controlled rectifier is "triggered on", current will flow in said path, including said coil and said response contacts will be activated thereby to disable said vehicle.

5. The anti-theft device, according to claim 4, wherein said inhibit means includes:
    a second silicon controlled rectifier having its anode and cathode connected in shunt across said relay coil whereby when said second silicon controlled rectifier is triggered "on", said relay response contacts will assume said operating position.

6. The anti-theft device, according to claim 5, wherein said device further includes an alarm means connected to provide an alarm signal when said inhibit means is activated.

7. The anti-theft device, according to claim 6, wherein said alarm is a buzzer and is coupled to receive activation energy only through said concealed switch.

8. The anti-theft device, according to claim 7, wherein said concealed switch has three positions, a "continuous on" position, a "momentary on" position, and an "off" position, and further includes a circuit path selectively coupling one of said "on" positions simultaneously to both said buzzer and the gate of second silicon controlled rectifier.

9. The anti-theft device, according to claim 8, wherein said vehicle includes an electrical accessory having at least one control element and said anti-theft device is associated therewith by having said concealed switch operable by said accessory control element.

10. The combination, according to claim 9, wherein said electrical accessory is a radio and said anti-theft device is incorporated into said radio chassis.

* * * * *